(12) United States Patent
Oder

(10) Patent No.: US 6,213,087 B1
(45) Date of Patent: Apr. 10, 2001

(54) ACTUATING SYSTEM FOR A DIRECT INJECTION INTERNAL COMBUSTION ENGINE, ESPECIALLY IN A VEHICLE

(75) Inventor: Michael Oder, Korntal-Münchingen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/423,566
(22) PCT Filed: May 6, 1998
(86) PCT No.: PCT/DE98/01245
  § 371 Date: Mar. 2, 2000
  § 102(e) Date: Mar. 2, 2000
(87) PCT Pub. No.: WO98/51920
  PCT Pub. Date: Nov. 19, 1998

(30) Foreign Application Priority Data

May 10, 1997 (DE) .............................................. 197 19 760

(51) Int. Cl.⁷ .................................................... F02B 17/00
(52) U.S. Cl. ............................................ 123/295; 123/305
(58) Field of Search ..................................... 123/295, 305

(56) References Cited

U.S. PATENT DOCUMENTS

| | | |
|---|---|---|
| 5,222,481 | 6/1993 | Morikawa . |
| 6,026,779 * | 2/2000 | Obata et al. ........................ 123/295 |
| 6,026,781 * | 2/2000 | Imatake et al. .................... 123/295 |
| 6,079,397 * | 6/2000 | Matsumoto et al. ............... 123/295 |

FOREIGN PATENT DOCUMENTS

| | | |
|---|---|---|
| 196 40 403 | 4/1997 | (DE) . |
| 2 233 388 | 1/1991 | (GB) . |
| 2 301 459 | 12/1996 | (GB) . |
| 60-030437 | 2/1985 | (JP) . |
| 8-200116 | 12/1996 | (JP) . |

* cited by examiner

Primary Examiner—Erick Solis
(74) Attorney, Agent, or Firm—Kenyon & Kenyon

(57) ABSTRACT

An internal combustion engine, in particular for a motor vehicle, is provided with injection valves with which fuel can be directly injected into the combustion chambers of the internal combustion engine either in a first mode during an induction period or in a second mode during a compression period. The internal combustion engine has an electronic control unit, by which the fuel quantities injected into the combustion chambers in the two modes can be open-loop and/or closed-loop controlled in varying ways. The electronic control unit is configured such that the first mode can be operated as the normal mode and the second mode as the exceptional mode. In this manner, further fuel savings are achieved in the operation of the internal combustion engine.

15 Claims, 1 Drawing Sheet

ACTUATING SYSTEM FOR A DIRECT INJECTION INTERNAL COMBUSTION ENGINE, ESPECIALLY IN A VEHICLE

BACKGROUND INFORMATION

The present invention relates to a method of operating an internal combustion engine, in particular for a motor vehicle, in which fuel is injected directly into a combustion chamber either in a first mode during a compression period or in a second mode during an induction period, and in which the fuel quantity injected into the combustion chamber is open-loop and/or closed-loop controlled in varying ways in the two modes. Furthermore, the present invention concerns an internal combustion engine, in particular for a motor vehicle, having an injection valve, by which fuel can be injected directly into a combustion chamber either in a first mode during an induction period or in a second mode during a compression period, and having an electronic control unit for the varying open-loop control and/or closed-loop control of the fuel quantity injected into the combustion chamber in the two modes.

Systems of this type for the direct injection of fuel into the combustion chamber of an internal combustion engine are generally known. In this context, a so-called stratified operation, as the first mode, is distinguished from a so-called homogeneous operation, as the second mode. The stratified operation is employed particularly with smaller loads, whereas the homogeneous operation is used for larger loads applied to the internal combustion engine. In stratified operation, the fuel during the compression period of the internal combustion engine is injected into the combustion chamber, specifically into the immediate vicinity of a spark plug. The result is that it is no longer possible to achieve a uniform distribution of the fuel in the combustion chamber, but rather the fuel is immediately ignited by the spark plug. The advantage of stratified operation lies in the fact that the smaller loads that are applied can be handled by the internal combustion engine using a very small quantity of fuel. However, larger loads cannot be managed using stratified operation. In homogeneous operation, which is provided for these types of larger loads, the fuel during the induction period of the internal combustion engine is injected so that it is possible immediately to achieve a swirl effect and thus a distribution of the fuel in the combustion chamber. To this extent, homogeneous operation roughly corresponds to the modus operandi of internal combustion engines in which fuel is commonly injected into the intake pipe.

In both modes, i.e., in stratified operation and in homogeneous operation, the fuel quantity to be injected is open-loop and/or closed-loop controlled as a function of a multiplicity of input variables towards an optimal value with respect to fuel economy, emission reduction, and the like. The open-loop and/or closed-loop control, in this context, is different in the two modes.

SUMMARY OF THE INVENTION

An object of the present invention is to indicate a direct-injection internal combustion engine, in which a further reduction of fuel consumption is possible.

This object is achieved in a method of the type mentioned at the beginning or in an internal combustion engine of the type mentioned at the beginning, in that the first mode is, or can be, operated as the normal mode and the second mode as the exceptional mode.

The first and the second modes, i.e., the stratified operation and the homogeneous operation, are therefore not equal in terms of value or of usefulness. According to the present invention, the stratified operation is prescribed as the normal mode of the internal combustion engine, whereas the homogeneous operation is prescribed as the mode of the internal combustion engine only in exceptional cases. As a result of this evaluation or weighting of the two modes, it comes about that the stratified operation is always preferred. At the same time, this means that the mode is preferred using which it is possible to achieve further fuel economies, namely the stratified operation. The system according to the present invention is therefore designed such that the homogeneous operation, which increases energy consumption, is treated as the exception whereas the stratified operation, which reduces energy consumption, is designated as the normal mode. In this way, greater fuel economy is achieved using the internal combustion engine according to the present invention.

In one advantageous embodiment of the present invention, the exceptional mode is requested. For this purpose, it is particularly advantageous if in the electronic control unit a signal is present which constitutes a request for the exceptional mode. A request of this type can, for example, be made indirectly by the driver, who presses down on the accelerator in order thus, for example, to accelerate in the motor vehicle. This simultaneously constitutes an increase in the load placed on the internal combustion engine, which can no longer be handled by the internal combustion engine in the stratified operation but rather only in the homogeneous operation. However, if the internal combustion engine is in its normal mode, i.e., in the stratified operation, then it is necessary to shift from the stratified operation to the homogeneous operation. This shifting is initiated by the request for the homogeneous operation, i.e., the exceptional mode. The consequence of this is that the internal combustion engine switches over to the homogeneous operation, which increases the fuel consumption, only in response to a special request. In the normal state, on the other hand, the internal combustion engine is always run in the fuel-economizing stratified operation.

In one advantageous refinement of the present invention, the normal mode is always used if there is no request for the exceptional mode. As a result of this measure, the weighting or evaluation of the two modes is realized. Therefore, there is no request or the like for the normal mode, but rather the shift is always carried out to the normal mode, or the normal mode is in use, if there is no request for the exceptional mode. In this way the internal combustion engine is always operated, in the normal case, in a fuel-economizing stratified operation and is only operated in the homogeneous operation in exceptional cases by request. In this manner, the fuel consumption, as was already mentioned, is further optimized.

It is particularly advantageous if in the electronic control unit there is a signal that designates the state of the normal mode. This means that the signal indicates whether the internal combustion engine is in the normal mode, i.e., in stratified operation, or not. In this way also, particularly in the electronic control unit, the evaluation or weighting of the two modes is expressed.

In one advantageous embodiment of the present invention, the exceptional mode is only used if the internal combustion engine satisfies certain operating conditions. In this manner, it is achieved that the transition from the stratified operation to the homogeneous operation can take place without any undesirable changes in the rpm's of the internal combustion engine, in particular without intense vibration. Thus by taking the aforementioned operating conditions into account, it can be achieved that the passengers of the vehicle virtually fail to notice this transition.

In one advantageous refinement of the present invention, the exceptional mode is only used if the quantity of air in the combustion chamber falls below a preselected level. This constitutes one measure by which intensive vibration is reliably avoided in the transition from stratified operation to homogeneous operation of the internal combustion engine.

In one advantageous embodiment of the present invention, the exceptional mode is only used if a prescribed time duration has elapsed since the preceding use of the exceptional mode.

In a further advantageous embodiment of the present invention, use of the exceptional mode is only terminated if a prescribed time duration has elapsed since the last use of the normal mode.

The two aforementioned embodiments represent temporal debouncing. In particular, by combining the two embodiments, it can be brought about that after a shifting into one of the two modes there is no immediate re-shifting back into the former, starting mode. A rapid shifting back and forth between the stratified operation and the homogeneous operation is therefore avoided. At least for the time duration specified in a given case, the mode is maintained which has just been shifted into. Only after this time duration expires is it possible to shift back into the starting mode. This represents a further improvement of the internal combustion engine according to the present invention with respect to avoiding fluctuations in the rpm's and therefore improvement with respect to the driving comfort for the passengers of the motor vehicle.

It is particularly advantageous if in the electronic control unit there is at least one signal that represents a time-dependent release for shifting into the exceptional mode and back again. In this way, in a particularly simple manner, a rapid shifting between the first and the second modes can be avoided. However, by taking into account the driver input, in particular a homogeneous request by the driver, it can, in this context, be assured that the torque requested by the driver will nevertheless in every case be supplied immediately.

In one advantageous embodiment of the present invention, in the electronic control unit there is at least one signal that represents a shifting into the exceptional mode and/or back again that is dependent on other functions, for example, on the fuel tank ventilation and/or the exhaust gas recirculation. This represents a functional debouncing by means of which a jolt is avoided in the switching into one of the two modes.

Of particular importance is the realization of the method according to the present invention in the form of an electrical storage medium, which is provided for an electronic control unit of an internal combustion engine, in particular of a motor vehicle. In this context, there is stored in the electrical storage medium a program that can be run on a computing element, in particular on a microprocessor, and that is suitable for carrying out the method according to the present invention. In this case, the present invention is realized through a program that is stored on the electrical storage medium, so that this storage medium furnished with the program represents the present invention in the same way as the method for whose execution the program is designed.

DETAILED DESCRIPTION

In a direct-injection internal combustion engine for a motor vehicle, provision is made, for example, for four combustion chambers having, in each case, a piston that can move back and forth, each combustion chamber, moreover, being provided with an injection valve. The injection valve is, in each case, arranged so that fuel can be injected directly into the associated combustion chamber. Furthermore, each of the combustion chambers is provided with a spark plug, by which the fuel in the respective combustion chamber can be ignited.

In a first mode, the stratified operation of the internal combustion action, the fuel is injected into the combustion chamber by the injection valve during a compression period that is brought about by the piston, specifically into the immediate vicinity of the spark plug, and temporally directly before the upper dead center of the piston. Then with the assistance of the spark plug the fuel is ignited so that the piston in the subsequent working period is driven by the expansion of the ignited fuel.

In a second mode, the homogeneous operation of the internal combustion engine, the fuel is injected into the combustion chamber by the injection valve during an induction period that is brought about by the piston. The injected fuel is swirled by the air that is simultaneously sucked in, and thus the fuel is distributed essentially uniformly in the combustion chamber. Subsequently, the fuel-air mixture is compressed during the compression period in order then to be ignited by the spark plug. As a result of the expansion of the ignited fuel, the piston is again driven.

The fuel quantity injected into the respective combustion chambers by the injection valves in the stratified operation and in the homogeneous operation is open-loop and/or closed-loop controlled by an electronic control unit, in particular with reference to low fuel consumption and/or low exhaust gas production. For this purpose, the electronic control unit is provided with a microprocessor, which has stored in a storage medium, in particular in a read-only memory, a program that is suitable for carrying out the above-mentioned open-loop and/or closed-loop control. The electronic control unit is acted upon by input signals, which represent the operating states of the internal combustion engine, which are detected by sensors, and it generates output signals, by which, via actuators, the behavior of the internal combustion engine can be influenced in accordance with the desired open-loop and/or closed-loop control.

Figure 1:
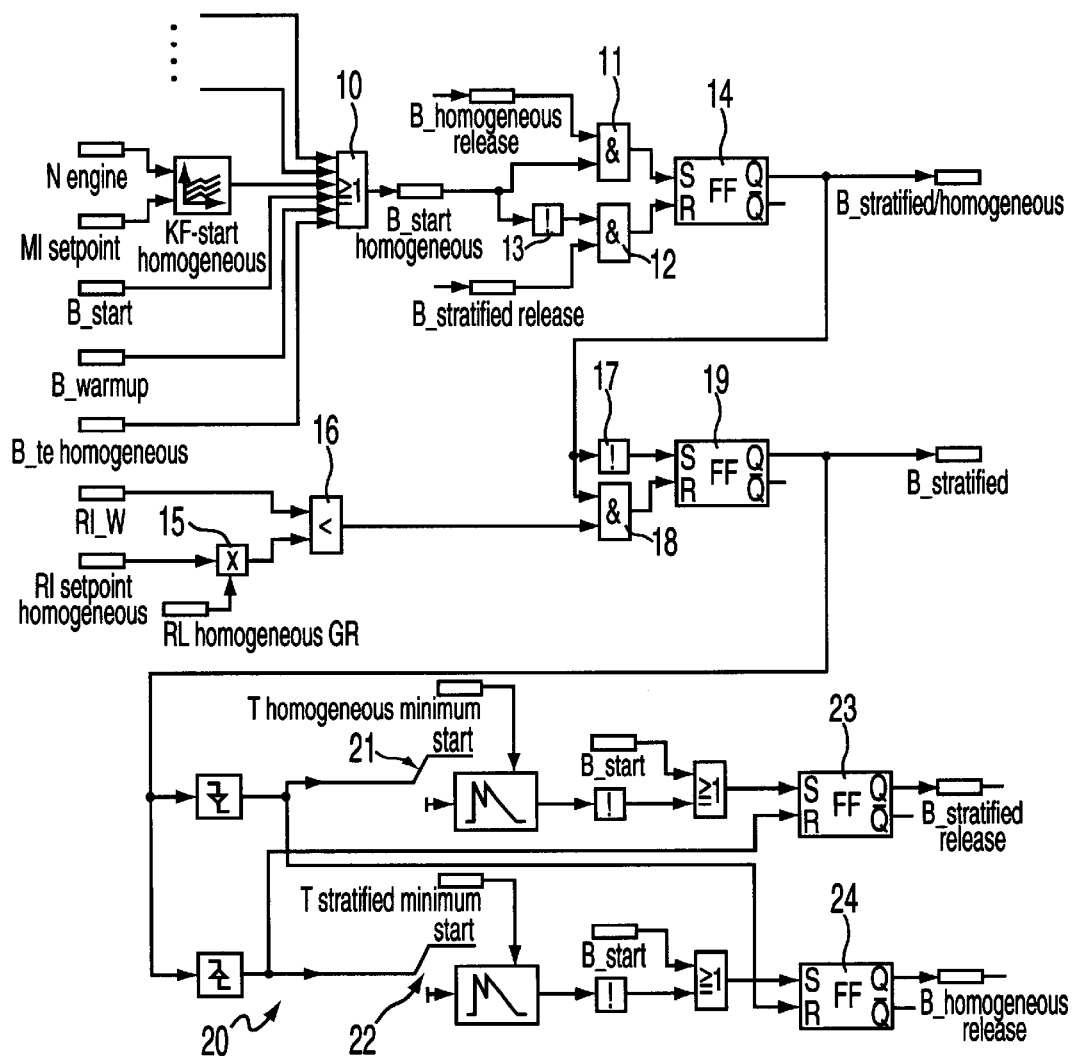
FIG. 1 shows a schematic block diagram of an exemplary embodiment of a system according to the present invention for operating an internal combustion engine of a motor vehicle.

In FIG. 1, the method is depicted by which the stratified operation and the homogeneous operation are controlled by the electronic control unit. In particular, the sequence is depicted in FIG. 1 as to how the electronic control unit switches between the stratified operation and homogeneous operation.

For the electronic control unit, stratified operation represents the normal mode of the internal commission engine. This is expressed by the fact that a signal B_schicht is present which is one bit wide and which indicates either, based on B_schicht=1, that the internal combustion engine is in this normal mode, i.e., in stratified operation, or which indicates, based on B_schicht=0, that the internal combustion engine is not using the stratified operation.

The homogeneous operation represents for the electronic control unit the exceptional mode of the internal combustion engine. For requesting this exceptional mode, in the electronic control unit a signal B_schhom is provided that is likewise one bit wide. If B_schhom=1, then this means that the internal combustion engine is to change to the homogeneous operation, i.e., that the exceptional mode is requested. If, the other hand, B_schhom=0, then this means that there is no request for the homogeneous operation, and that therefore the internal combustion engine is to be operated in its normal mode.

The electronic control unit therefore controls both of the modes of the internal combustion engine, always proceeding from the normal mode, the stratified operation. This means that the internal combustion engine is only shifted into the homogeneous operation if the corresponding request exists, but otherwise is operated always in the stratified operation.

A request for the homogeneous operation can be made for a multiplicity of reasons. Thus it is possible that due to the actuation of the accelerator by the driver there is detected by the electronic control unit a desired torque misoll, which is to be supplied by the internal combustion engine. As a function of rotational speed nmot and the aforementioned desired torque, a request for the homogeneous operation can arise via an ignition map KFANFHOM, if the stratified operation in use heretofore is not suitable for generating the requested torque. Further possibilities for requesting the homogeneous operation can arise in the starting of the internal combustion engine or during the warm-up period of the internal combustion engine or due to a fuel tank venting into the combustion chambers of the internal combustion engine. These possibilities are present in the electronic control unit as signals B_start and B_warm-up and B_tehom. Each of these possibilities as well as, if appropriate, further possibilities of this type, across an OR-gate 10, in each case produce a signal B_anfhom that is one bit wide, with B_anfhom=1, if there is a request for the homogeneous operation.

Subsequently, B_anfhom is linked to two release signals B_homfreigabe and B_schfreigabe. The signals are in each case one bit wide and function to release the homogeneous operation or the stratified operation. Only if B_homfreigabe=1 can the requested homogeneous operation actually be used. If this is not the case, the system must wait until B_homfreigabe=1. In this context, it can be assured, for example, by a signal that can be coupled across an OR-gate, that a torque requested by the driver can be generated rapidly and at any time.

The same applies to B_schfreigabe with respect to the use of the stratified operation, if there is no longer any request for homogeneous operation, i.e., if B_anfhom=0.

Both release signals have the purpose of preventing a rapid switching back and forth between the homogeneous operation and the stratified operation. As will be explained below, the two release signals are obtained with the assistance of time delays from the signal B_schicht. They assure that after every change of mode and thus after every change from B_schicht, a release for the next change of mode will only take place after a specifiable time duration.

In accordance with FIG. 1, the linking of B_anfhom to B_homfreigabe and B_schfreigabe occurs using two AND-gates 11, 12, an inverter 13, and a flip-flop 14. The output signal of this arrangement is then signal B_schhom.

Thereafter, B_schhom is linked to a signal that indicates certain operating conditions of the internal combustion engine. These operating conditions are the air charge or the air quantity in the combustion chambers and, if appropriate, in the intake areas of the internal combustion engine. This air charge has to be less than a specifiable value. Only then may the switch to the homogeneous operation take place. If the switch were carried out earlier, it would lead to an excess torque which the electronic control unit could no longer compensate for, and that therefore would lead to undesirable rpm fluctuations.

In FIG. 1 this is achieved by linking a signal rlsolhom to a signal RLHOMGR and by comparing the results with a signal rl_w. If the aforementioned Smaller-Condition is satisfied, then as the signal a 1 is generated, otherwise a 0 is generated. For generating this signal indicating the preselected operating conditions, provision is made in FIG. 1 for a logic gate 15 and a Smaller-Than gate 16.

The linking of the signal characterizing the preselected operating conditions to B_schhom occurs in FIG. 1 with the assistance of an inverter 17, an AND-gate 18, and a flip-flop 19. The output signal of this arrangement is the signal B_schicht.

If B_schhom=1, i.e., the exceptional mode, homogeneous operation, is requested, then the S-input of flip-flop 19 is reset. The R-input is only set if in addition the preselected operating conditions are satisfied, i.e., if the air charge has sunk below the prescribed value. Only then is B_schicht=0, i.e., is the switch to homogeneous operation actually made.

Figure 2:
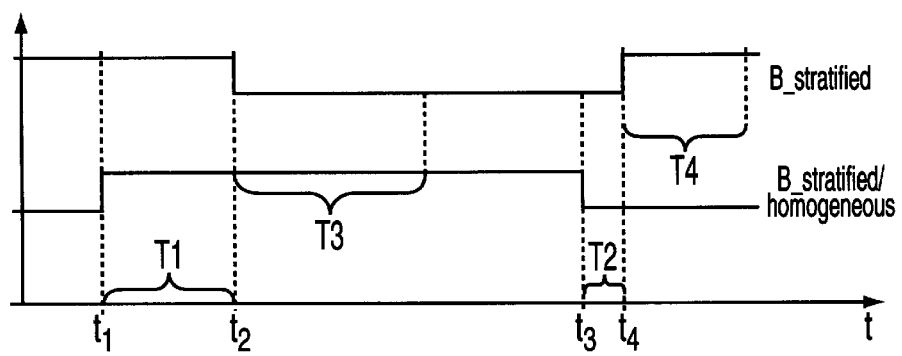
FIG. 2 shows a schematic diagram of two signals contained in the block diagram of FIG. 1.

This is depicted in FIG. 2. There, at time point t1, B_schhom makes the transition from 0 to 1. Thus at time point t1, the homogeneous operation is requested. The actual transition, however, does not take place immediately, but only after a time duration T1 and thus only at time point t2. Time duration T1, in this context, is dependent on selected operating conditions being attained, thus according to FIG. 1, after the air charge sinks below a preselected level. The exceptional mode is therefore only actually used if the internal combustion engine satisfies certain operating conditions.

If, subsequently, B_schhom=0, i.e., the homogeneous operation is no longer requested, then in accordance with FIG. 1, flip-flop 19 is immediately switched over and therefore B_schicht=1. Thus the switch is immediately made back to the stratified operation.

It is possible that even in this switching back to the stratified operation a time delay is built in which is dependent in particular on the satisfaction of preselected operating conditions. This is not depicted in FIG. 1, but does emerge from FIG. 2. Provision is made there, for example, for a time delay T2 between the transition of B_schhom from 1 to 0 and the actual switching of B_schicht from 0 to 1.

As already mentioned, B_schicht is used to control the two release signals B_homfreigabe and B_schfreigabe. This is achieved in FIG. 1 with the assistance of arrangement 20. Arrangement 20 for this purpose has two time delay units 21,22 and two flip-flops 23,24. The output signal of flip-flop 23 is signal B_schfreigabe, and the output signal of flip-flop 24 is signal B_homfreigabe.

If B_schicht goes from 1 to 0, i.e., the internal combustion engine goes from stratified operation to homogeneous operation, then the R-input of flip-flop 24 is reset. Moreover, time delay unit 21 is started so that after a first preselected time duration has elapsed, the S-input of flip-flop 23 is set. In this way, B_schfreigabe=1, which means that the release is present for a switching back of the internal combustion engine from homogeneous operation to stratified operation. Therefore, the first time duration represents the time delay during which, at a minimum, the internal combustion engine must remain in the homogeneous operation before it can be reset to stratified operation. This first time duration is noted, by way of example, in FIG. 2 as T3. The use of the exceptional mode can therefore only be terminated if specifiable time duration T3 has elapsed since the last use of the normal mode.

If B_schicht then goes again from 0 to 1, i.e., the exceptional mode is again abandoned, then the R-input of flip-flop 23 is reset. Moreover, time delay unit 22 is started, so that after a second time duration has elapsed the S-input of flip-flop 24 is set. In this way, B_homfreigabe=1, which means that the release has been given for a renewed switching into the homogeneous operation. Thus the second time duration represents a time delay during which, at a minimum, the internal combustion engine must remain in stratified operation before it can be switched again to homogeneous operation. This second time duration is indicated, by way of example, in FIG. 2 as T4. Therefore, the exceptional mode can only be used again if specifiable time duration T4 has elapsed since the last use of the exceptional mode.

The first and the second time durations can be of the same magnitude, although this is not mandatory. The two time durations can be influenced via minimal values THOMMIN and/or TSCHMIN. Furthermore, it is also possible to operate the two time delay units 21, 22 during the start of the internal combustion engine in different ways. In particular, provision can be made using signal B__start that during the start of the internal combustion engine both release signals B__schfreigabe and B__homfreigabe are always equal to 1.

Furthermore, it is possible that release bits of certain functions are queried before the switch is made to a different mode. Functions of this type can be, for example, fuel tank ventilation and/or exhaust gas recirculation. The release bits can, for example, block a switch if, before the switching, it is necessary to wait for a valve to close, for example, the tank ventilation valve and/or the exhaust gas recirculation valve. Closing a valve in this way, before a switching-over, can be necessary in order to avoid an intense vibration in response to the switching.

What is claimed is:

1. A method for operating an internal combustion engine, comprising the steps of:
   directly injecting a fuel quantity into a combustion chamber of the internal combustion engine according to one of a first mode during a compression period and a second mode during an induction period; and
   controlling in the first mode and in the second mode the fuel quantity injected into the combustion chamber according to at least one of an open-loop control and a closed-loop control, the open-loop control being performed in a way that is different than a way according to which the closed-loop control is performed, wherein;
   the first mode is operated as a normal mode,
   the second mode is operated as an exceptional mode,
   the exceptional mode is requested on the basis of an operating state of the internal combustion engine,
   the normal mode is always used if no request for the exceptional mode is made, and
   the exceptional mode is only used if a first preselected time duration has elapsed since the last use of the exceptional mode.

2. The method according to claim 1, wherein the internal combustion engine is included in a motor vehicle.

3. The method according to claim 1, wherein a use of the exceptional mode is only terminated if a second preselected time duration has elapsed since the last use of the normal mode.

4. The method according to claim 1, wherein the exceptional mode is only used if the internal combustion engine satisfies a set of operating conditions.

5. The method according to claim 4, wherein the exceptional mode is only used if a quantity of air in the combustion chamber is below a preselected level.

6. An electrical storage medium for an electronic control unit of an internal combustion engine, the electrical storage medium storing a program for execution on a computing element, the computing element using the program in the electrical storage medium to perform the steps of:
   directly injecting a fuel quantity into a combustion chamber of the internal combustion engine according to one of a first mode during a compression period and a second mode during an induction period; and
   controlling in the first mode and in the second mode the fuel quantity injected into the combustion chamber according to at least one of an open-loop control and a closed-loop control, the open-loop control being performed in a way that is different than a way according to which the closed-loop control is performed, wherein;
   the first mode is operated as a normal mode,
   the second mode is operated as an exceptional mode,
   the exceptional mode is requested on the basis of an operating state of the internal combustion engine,
   the normal mode is always used if no request for the exceptional mode is made, and
   the exceptional mode is only used if a first preselected time duration has elapsed since the last use of the exceptional mode.

7. The electrical storage medium according to claim 6, wherein the electrical storage medium includes a read-only memory.

8. The electrical storage medium according to claim 6, wherein the internal combustion engine is included in a motor vehicle.

9. The electrical storage medium according to claim 6, wherein the computing element includes a microprocessor.

10. An internal combustion engine, comprising:
    a combustion chamber;
    an injection valve, by which a fuel quantity is directly injected into the combustion chamber according to one of a first mode during an induction period and a second mode during a compression period; and
    an electronic control unit for performing in the first mode and in the second mode a varying according to at least one of an open-loop control and a closed-loop control of the fuel quantity injected into the combustion chamber, wherein:
    the first mode is operated as a normal mode,
    the second mode is operated as an exceptional mode,
    the exceptional mode is requested on the basis of an operating state of the internal combustion engine,
    the normal mode is always used if no request for the exceptional mode is made, and
    the electronic control unit provides at least one signal representing a time-dependent release of at least one of a switching to the exceptional mode and a switching from the exceptional mode.

11. The internal combustion engine according to claim 10, wherein the internal combustion engine is included in a motor vehicle.

12. The internal combustion according to claim 10, wherein the electronic control unit provides a signal representing a request for the exceptional mode.

13. The internal combustion engine according to claim 10, wherein the electronic control unit provides a signal for designating a state of the normal mode.

14. The internal combustion engine according to claim 10, wherein:
    the electronic control unit provides a signal representing the at least one of the switching to the exceptional mode and the switching from the exceptional mode, and
    the switching is dependent on a plurality of functions.

15. The internal combustion engine according to claim 14, wherein the switching occurs as a function of at least one of a tank ventilation and an exhaust gas recirculation.

* * * * *